Sept. 25, 1951 P. J. BURDULIS 2,568,945
ARMATURE WINDING MACHINE
Filed April 16, 1948 4 Sheets-Sheet 1

INVENTOR
Peter J. Burdulis
BY
ATTORNEYS

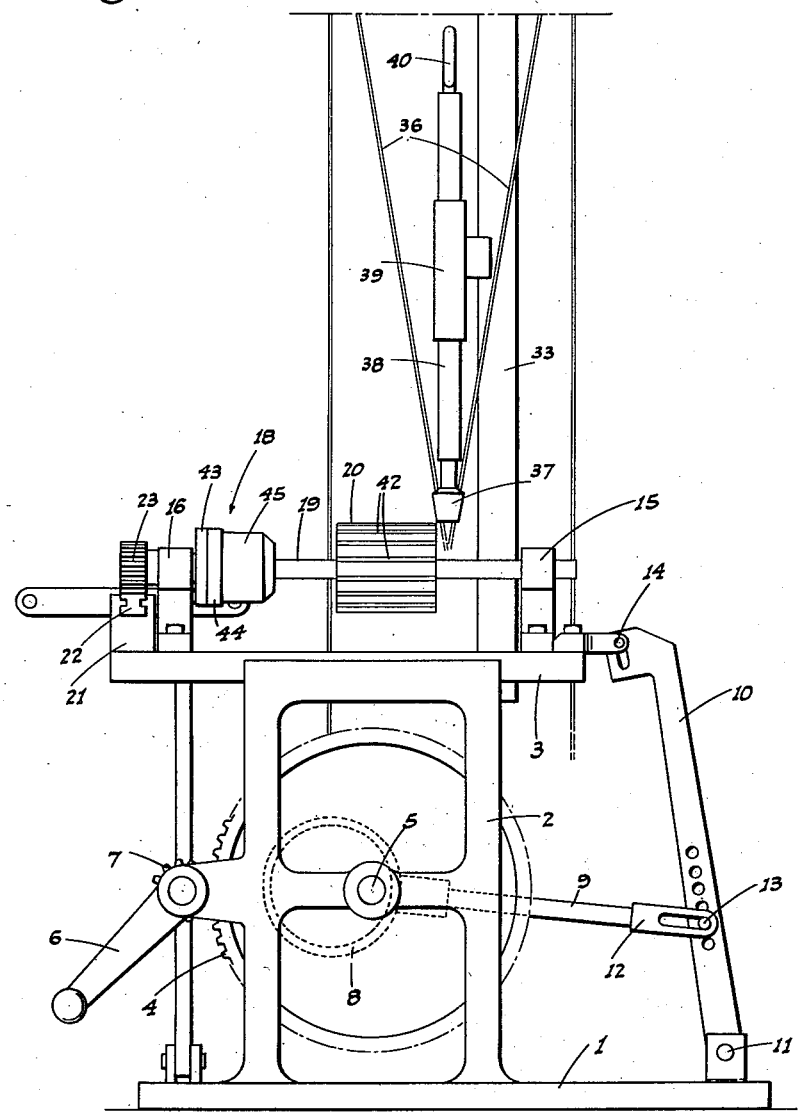
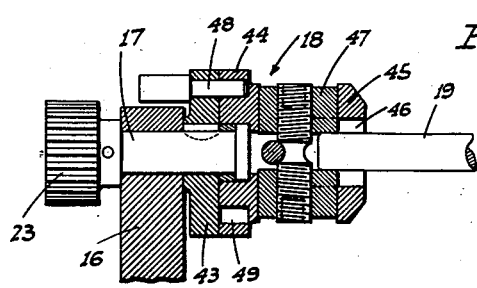

Sept. 25, 1951     P. J. BURDULIS     2,568,945
ARMATURE WINDING MACHINE
Filed April 16, 1948     4 Sheets—Sheet 3

INVENTOR
Peter J. Burdulis
BY
ATTORNEYS

Sept. 25, 1951 P. J. BURDULIS 2,568,945
ARMATURE WINDING MACHINE
Filed April 16, 1948 4 Sheets-Sheet 4

INVENTOR.
Peter J. Burdulis
BY
ATTYS

Patented Sept. 25, 1951

2,568,945

UNITED STATES PATENT OFFICE 2,568,945

ARMATURE WINDING MACHINE

Peter J. Burdulis, Delhi, Calif.

Application April 16, 1948, Serial No. 21,520

7 Claims. (Cl. 242—13)

This invention is directed to, and it is an object to provide, an improved armature winding machine, especially small type armatures for automobile generators or those of the smallest type of electric motors.

Another object of the invention is to provide an armature winding machine wherein the wire is fed from a stationary guide head; there being novel, driven mechanism operative to support the armature and to actuate it through a winding or wire receiving cycle in adjacent cooperative relation to said stationary guide head.

An additional object of the invention is to provide an armature supporting mechanism operative to axially reciprocate and to circumferentially oscillate the armature with respect to the guide head; the reciprocating strokes and oscillating movements alternating so that the wire is wound in the desired loop form between opposed slots of the armature.

A further object of the invention is to provide an armature winding machine which embodies a novel chuck unit; the latter including an effective indexing arrangement.

A further object of the invention is to provide a practical and reliable armature winding machine, and yet one which will be exceedingly effective for the purpose for which it is designed.

These objects are accomplished by means of such structure and relative arrangement of parts as will fully appear by a perusal of the following specification and claims.

In the drawings:

Fig. 2 is a similar view, but shows the armature reciprocated in the opposite direction.

Fig. 6 is an enlarged fragmentary sectional elevation of the chuck unit, including the indexing arrangement.

Figure 1:
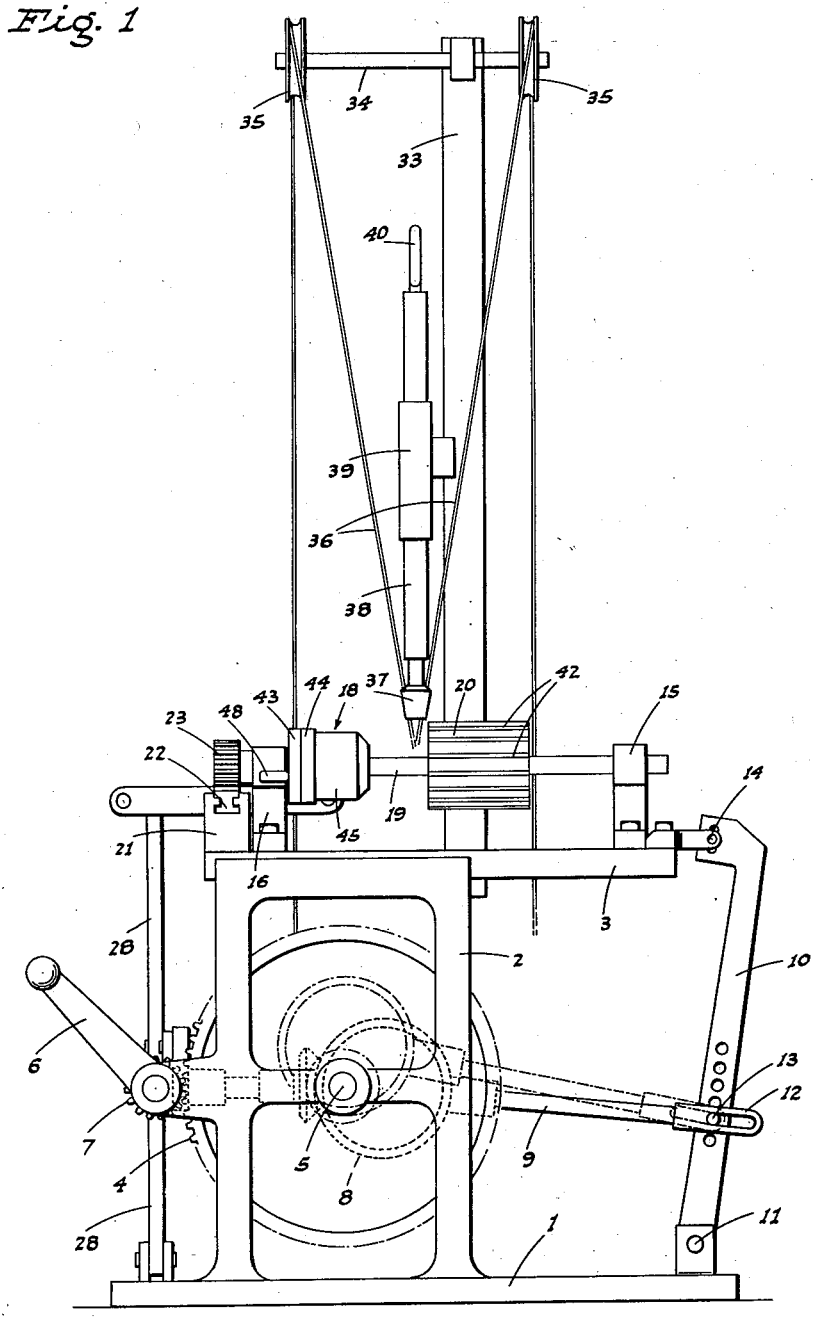
Fig. 1 is a side elevation of the improved armature winding machine, as in use; the armature being shown reciprocated in one direction.
Figure 4:
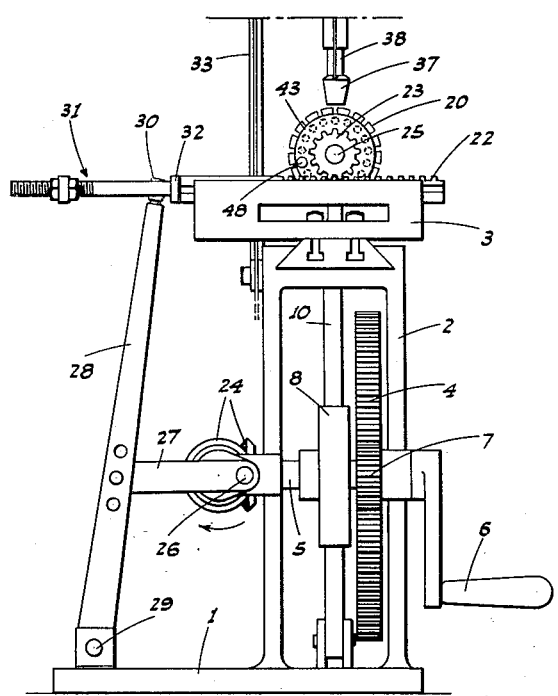
Fig. 4 is a similar view, but shows the armature oscillated in the opposite direction.
Figure 3:
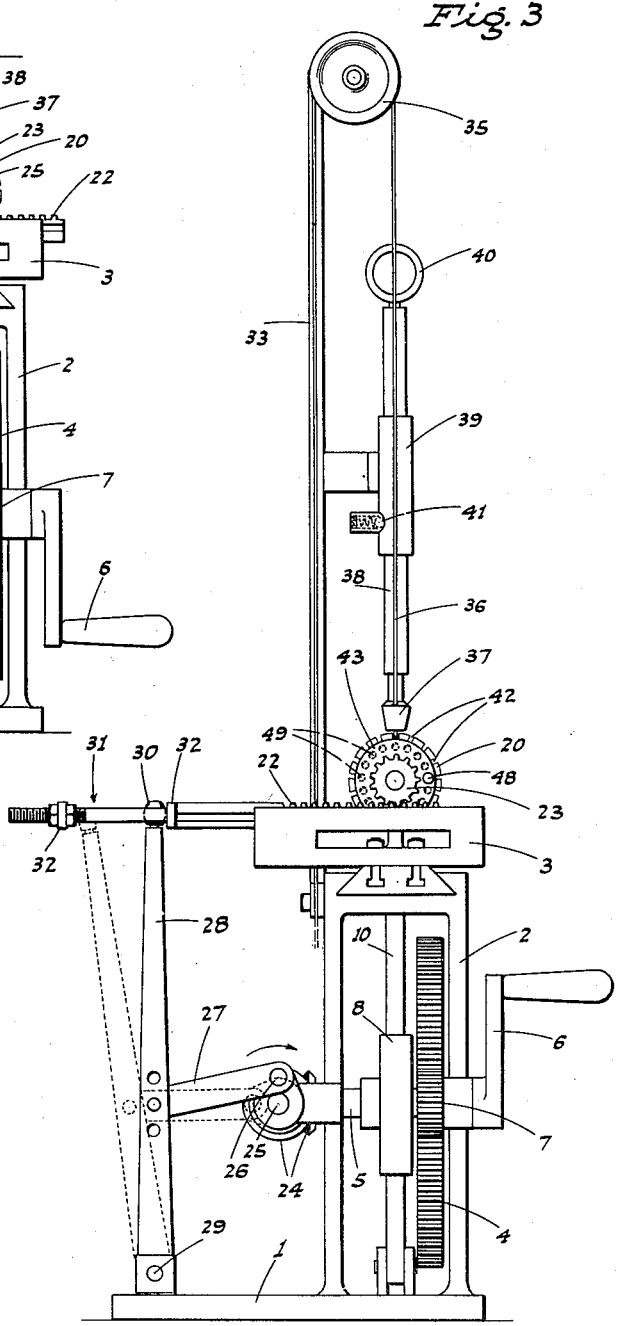
Fig. 3 is an end view of the machine showing the armature as oscillated in one direction.

Referring now more particularly to the characters of reference on the drawings, the improved armature winding machine comprises a base 1 having a frame 2 upstanding therefrom. At the top of the frame 2, the latter is fitted with a horizontal longitudinally reciprocable slide 3; such slide being actuated by the following means.

A relatively large-diameter gear 4 is journaled in the frame 2 by means of a cross shaft 5, and as here shown, a hand crank 6, including a pinion 7, is employed to rotate the gear 4. An eccentric unit 8 is secured on the cross shaft 5, and a connecting rod 9 extends from said eccentric unit to an upstanding swing lever 10 pivoted, at its lower end, in connection with the base, as at 11, for swinging motion, in a vertical plane in the same direction as reciprocating motion of the slide 3.

The connecting rod 9 is attached to the swing lever 10 by a lost-motion connection 12 which includes a pin 13 vertically adjustably secured to said lever. At its upper end the swing lever 10 is pivotally connected, as at 14, to the adjacent end of the slide 3.

Thus, upon rotation of pinion 7 and gear 4, reciprocating motion is imparted to the slide 3; there being a substantial dwell between the strokes of said slide, and said dwell being accomplished by the embodiment in the mechanism of the lost-motion connection 12.

The slide 3 carries, in longitudinally spaced relation, an upstanding cradle 15 and an upstanding bearing 16. The bearing 16 has a stub shaft 17 journaled therein, and at the end adjacent the cradle 15 said stub shaft is fitted with a chuck unit, indicated generally at 18, which is hereinafter described in detail. The chuck unit 18 is adapted to receive one end of the shaft 19 of an armature 20, while the other end portion of said shaft 19 rests in the cradle 15. With the above arrangement, the armature 20 is supported with its shaft 19 horizontal and in parallelism with the slide 3. As the slide 3 reciprocates, likewise does the armature 20, the same dwell being imparted to the armature as there is to the slide. At the time of each such dwell, i. e. at the end of each reciprocating stroke of the slide 3 and armature 20, the latter is oscillated by the following described mechanism; the oscillation first being in one direction, and after the intervening reciprocating stroke being in an opposite direction.

Longitudinally outwardly of the chuck unit 18, the slide 3 is fitted with a cross block 21, and a slide rack 22 is mounted in connection with said cross block 21 for travel, horizontally, in a path at right angles to the path of motion of said slide 3. The slide rack 22 has upwardly disposed teeth which mesh with a pinion 23 on the outer end of the stub shaft 17. It will be recognized that upon back and forth travel of the slide rack 22, its teeth, working with the pinion 23, will oscillate the armature 20 through a predetermined circumferential or arcuate path.

On the side of the machine opposite the hand crank 6, the cross shaft 5 drives a bevel pinion assembly 24, which in turn actuates a horizontal countershaft 25 disposed at right angles to the cross shaft 5. Below the slide rack 22 the countershaft 25 is fitted with a crank 26 pivotally attached by a link 27 with a swing lever 28. The swing lever 28 is pivoted, as at 29, to the base 1 and upstands therefrom for swinging motion in the same direction as the slide rack 22 travels; the link 27 being vertically adjustably coupled to said lever 28 for pre-setting of the throw of the latter.

At its upper end the swing lever 28 includes a roller 30 which works in a lost-motion yoke 31 attached to the outer or free end of the slide rack 22. This lost-motion yoke 31 permits of free travel of the roller 30 between spaced transverse bars 32, and additionally the yoke is elongated in the direction of reciprocation of the slide 3. The purpose of this arrangement is to permit the slide 3 to reciprocate in either direction without interference by the roller 30 or swing lever 28.

Figure 5:
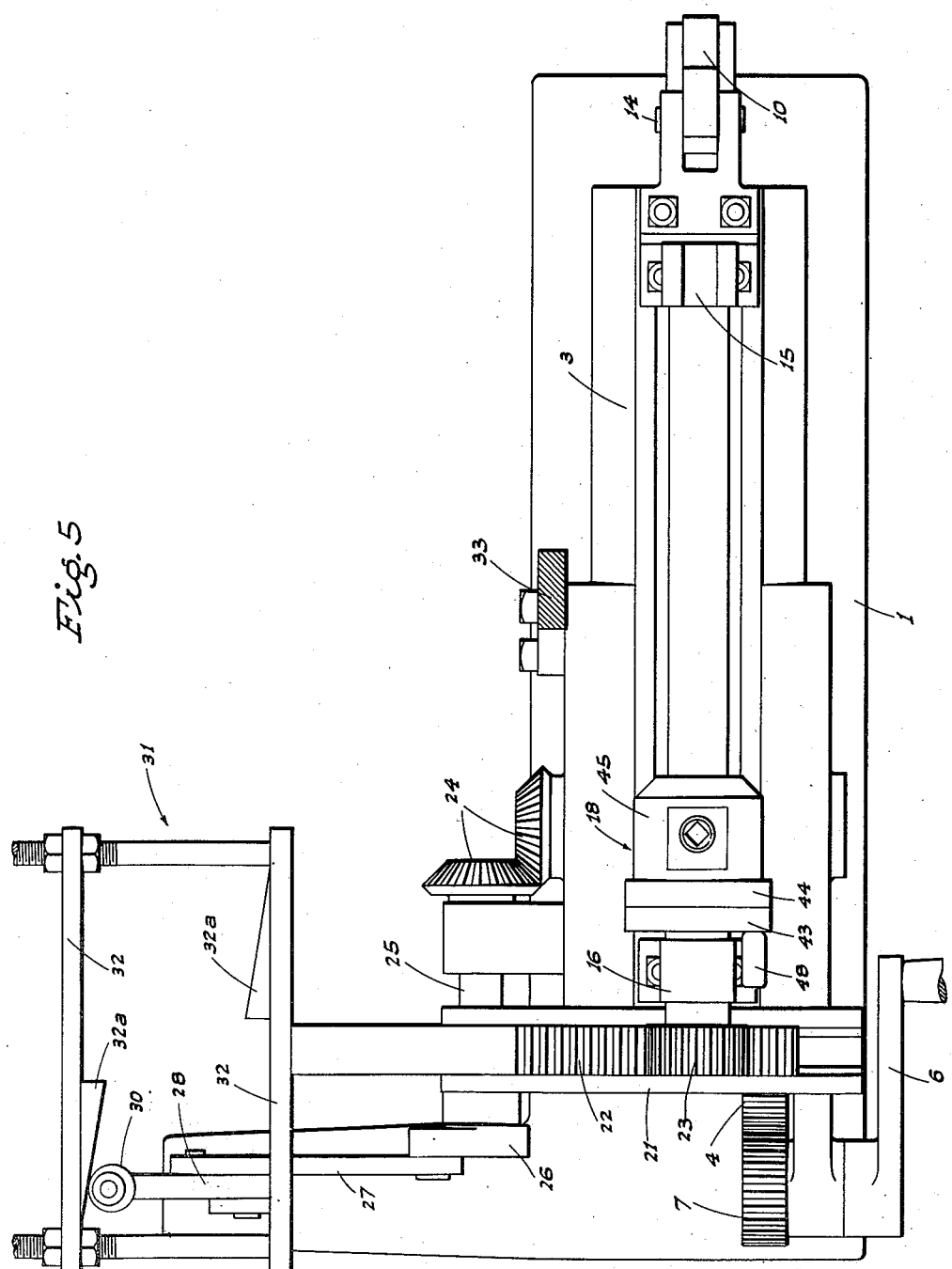
Fig. 5 is an enlarged plan view of the armature supporting and actuating mechanism.

Wedge-like cam members 32a slope inwardly of the yoke area from opposite ends of bars 32, as shown in Fig. 5; these members being positioned so that when roller 30 is at its outermost limit of travel, it will engage one of said members, and when at its inward limit of travel, the roller will engage the other member.

The timing of the mechanism is such that when the slide 3 reaches each end of its path of travel, followed by a dwell as previously described, the roller acts during each such dwell, as follows:

During one dwell the roller 30 bears against the outermost bar 32, and the swing lever 28 then travels in an outward direction to shift the slide rack 22 outwardly, to the point shown in Fig. 5; whereas at the opposite end dwell of the slide 3, and after a half-stroke of arm 28, the roller 30 bears against the innermost bar 32 adjacent the other end of the yoke 31, and the swing lever 28 then works inwardly to cause the slide rack 22 to move in a corresponding direction. As the slide rack 22 is worked back and forth, as described, there is an arcuate or circumferential oscillation imparted to the armature 20.

The cam members 32a serve to prevent any undesired lateral movement of the yoke and rack as slide 3, on which the yoke is mounted, is moving in one direction or the other to shift the armature, and thus prevents any rotary movement of the armature during such shifting thereof.

The timing of the above described mechanism is such that each winding or wire receiving cycle of the armature comprises reciprocating strokes and oscillating movements, alternately.

The wire guide structure of the machine comprises a post 33 which upstands from the frame 2 to one side of the armature shaft; such post having a horizontal top shaft 34 journaled in connection therewith parallel to the shaft 19 of a supported armature 20. The shaft 34 carries spaced guide pulleys 35, and a pair of wires 36 lead upwardly from spools (not shown) over the pulleys 35 and thence downwardly to, and through, a wire guide head 37 disposed directly and radially above the supported armature 20, and a point substantially centrally intermediate the ends of the path of travel of the slide 3. The wire guide head 37 is secured to the lower end of a wire guide spindle 38 and extends through a vertical sleeve 39 affixed to the post 33.

At its upper end, and above the sleeve 39, the spindle 38 is fitted with a handle 40; there being a spring-pressed holding device 41 which normally maintains the spindle 38 in selected position of adjustment in the sleeve 39.

When the machine is in operation, the wires 36 feed from the wire guide head 37 into the longitudinal slots 42 of the armature 20. With each winding or wire receiving cycle of the armature, the wire is wound in a loop which extends through related and generally opposed slots 42 and diagonals across the ends of the armature.

After each winding or wire receiving cycle of the armature, it is re-set in its circumferential position so that the next wire loop is wound in other generally opposed or corresponding slots; this re-setting being accomplished by novel indexing means incorporated in the chuck unit, and the latter is constructed as shown in detail in Fig. 6, wherein:

The chuck unit includes a face plate 43 keyed on the stub shaft 17, and working in abutting relation with another face plate 44 on the inner end of a chuck 45 rotatably but axially immovably secured to the inner end of said stub shaft 17. The chuck 45 includes a bore 46 to receive the armature shaft, the latter being held in the bore by opposed screw-actuated jaws 47.

An index pin 48 extends through the face plate 43 into any selected one of a circumferential row of pin receiving bores 49 in the face plate 44 of chuck 45.

With the above index pin arrangement the armature 20 can be indexed or pre-set, as the operator may desire.

Thus, after each pair of armature slots are wound full or to the required number of windings or loops, it requires only a simple manipulation to re-set the armature for the winding of the next adjacent loop.

For armatures of different length, the slide 3 must have a different stroke, and such stroke is pre-set by the adjustment of the lost-motion connection 12 with the swing lever 10. In a similar manner, the arcuate or circumferential extent of oscillation of the armature, to predetermine the span of each wire loop wound thereon, can be adjusted by connection of the link 27 at variable points to the swing lever 28.

With the above described machine, armatures can be wound rapidly and effectively; the machine being simple in its structure yet reliable and accurate in operation.

Although shown as being a hand operated machine, power, as from an electric motor, can be applied in lieu of the hand crank 6 if desired. In this case, an automatic switch could be employed to stop the motor when any desired number of wires had been wound into the armature slots.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An armature winding machine comprising an upstanding frame, a horizontal slide mounted on the frame, a chuck assembly on the slide adapted to receive the armature shaft with the latter parallel to the path of motion of the slide, said assembly including a rotary chuck having a shaft, a pinion on the shaft, a rack in mesh with the pinion mounted on the slide for transverse guided motion, a swing lever on the frame corresponding and connected to the slide and mounted for movement in the same direction, another swing lever on the frame corresponding and connected to the rack and mounted for movement in the same direction, connections between the levers and said slide and rack, and means arranged to swing said levers in a manner to alternately impart reciprocating strokes to the slide and rack in a predetermined cycle.

2. An armature winding machine comprising an upstanding frame, a horizontal slide mounted on the frame, a chuck assembly on the slide adapted to receive the armature shaft with the latter parallel to the path of motion of the slide, said assembly including a rotary chuck having a shaft, a pinion on the shaft, a rack in mesh with the pinion mounted on the slide for transverse guided motion, a swing lever on the frame corresponding and connected to the slide and mounted for movement in the same direction, another swing lever on the frame corresponding and connected to the rack and mounted for movement in the same direction, and means, including the levers and lost-motion connections, arranged to impart alternate reciprocating strokes to the slide and rack in a predetermined cycle.

3. An armature winding machine comprising an upstanding frame, a horizontal slide mounted on the frame, a chuck assembly on the slide adapted to receive the armature shaft with the latter parallel to the path of motion of the slide, said assembly including a rotary chuck having a shaft, a pinion on the shaft, a rack in mesh with the pinion mounted on the slide for transverse guided motion, a swing lever on the frame corresponding and connected to the slide and mounted for movement in the same direction, another swing lever on the frame corresponding and connected to the rack and mounted for movement in the same direction, and means, including the levers and lost-motion connections, arranged to impart alternate reciprocating strokes to the slide and rack in a predetermined cycle; said means comprising in relation to said one lever, a connecting rod, and an eccentric unit to reciprocate the rod; there being a corresponding lost-motion connection between the rod and said one lever.

4. An armature winding machine comprising an upstanding frame, a horizontal slide mounted on the frame, a chuck assembly on the slide adapted to receive the armature shaft with the latter parallel to the path of motion of the slide, said assembly including a rotary chuck having a shaft, a pinion on the shaft, a rack in mesh with the pinion mounted on the slide for transverse guided motion, a swing lever on the frame corresponding and connected to the slide and mounted for movement in the same direction, another swing lever on the frame corresponding and connected to the rack and mounted for movement in the same direction, and means, including the levers and lost-motion connections, arranged to impart alternate reciprocating strokes to the slide and rack in a predetermined cycle; said means comprising, in relation to said other lever, a connecting rod, and an eccentric unit to reciprocate the rod, there being a corresponding lost-motion connection between said other lever and the rack.

5. An armature winding machine comprising an upstanding frame, a horizontal slide mounted on the frame, a chuck assembly on the slide adapted to receive the armature shaft with the latter parallel to the path of motion of the slide, said assembly including a rotary chuck having a shaft, a pinion on the shaft, a rack in mesh with the pinion mounted on the slide for transverse guided motion, a swing lever on the frame corresponding and connected to the slide and mounted for movement in the same direction, another swing lever on the frame corresponding and connected to the rack and mounted for movement in the same direction, both swing levers being pivoted to the frame in upstanding position, a horizontal shaft journaled on the frame below and transversely of the slide, means to rotate the shaft, an eccentric unit on the shaft, a connecting rod extending from the eccentric unit to said one lever, a lost-motion connection between the connecting rod and said one lever, another horizontal shaft journaled on the frame parallel to the slide and driven from said first named shaft, a crank on said other shaft, a connecting rod between the crank and said other lever, and a lost-motion connection between said other lever and the rack.

6. An armature winding machine comprising an upstanding frame, a horizontal slide mounted on the frame, a chuck assembly on the slide adapted to receive the armature shaft with the latter parallel to the path of motion of the slide, said assembly including a rotary chuck having a shaft, a pinion on the shaft, a rack in mesh with the pinion mounted on the slide for transverse guided motion, a swing lever on the frame corresponding and connected to the slide and mounted for movement in the same direction, another swing lever on the frame corresponding and connected to the rack and mounted for movement in the same direction, both swing levers being pivoted to the frame in upstanding position, a horizontal shaft journaled on the frame below and transversely of the slide, means to rotate the shaft, an eccentric unit on the shaft, a connecting rod extending from the eccentric unit to said one lever, a lost-motion connection between the connecting rod and said one lever, another horizontal shaft journaled on the frame parallel to the slide and driven from said first named shaft, a crank on said other shaft, a connecting rod between the crank and said other lever, and a lost-motion connection between said other lever and the rack; said last named lost motion connection being an open yoke including spaced bars extending transversely of the rack, the upper portion of said other lever projecting into the yoke between said bars, the latter being at least as long as the stroke of the slide.

7. In combination: a base; a supporting frame on the base, a slide mounted in the frame for reciprocating movement, a chuck unit and a cradle spaced apart longitudinally of and mounted on the slide and adapted to receive and support an armature shaft, a pinion forming a part of the chuck unit, a cross block on the slide, a rack slidably mounted in the block at right angles to the slide and engaging the pinion, a slotted cross head on the outer end of the rack, a lever mounted on the base for swinging motion in a vertical plane longitudinally of the slide, the free end of the lever being connected with one end of the slide, another lever pivoted on the base for swinging motion in a vertical plane at right angles to the slide, the free end of such other lever projecting into said cross head and adapted to alternately engage first one side and then the other of such cross head with the swinging of the last named lever whereby to reciprocate the rack, a driven shaft, means connecting the driven shaft in driving relation with both levers, the connection between the shaft and the first named lever including a lost motion unit effective to avoid movement of such lever during movement of the rack by the other lever, and wire feeding means positioned to feed wire to an armature supported on the slide.

PETER J. BURDULIS.

REFERENCES CITED

The following references are of record in the file of this patent:

UNITED STATES PATENTS

| Number | Name | Date |
| --- | --- | --- |
| 1,504,253 | McCord | Aug. 12, 1924 |
| 2,003,169 | Baldwin | May 28, 1935 |
| 2,381,750 | Hunsdorf | Aug. 7, 1945 |